United States Patent
Kawada et al.

(10) Patent No.: US 8,358,646 B2
(45) Date of Patent: Jan. 22, 2013

(54) TEMPORARY CONNECTION NUMBER MANAGEMENT SYSTEM, TERMINAL, TEMPORARY CONNECTION NUMBER MANAGEMENT METHOD, AND TEMPORARY CONNECTION NUMBER MANAGEMENT PROGRAM

(75) Inventors: Masato Kawada, Tokyo (JP); Yoshiya Asaumi, Tokyo (JP); Yasuto Masuda, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 12/452,847

(22) PCT Filed: Jul. 24, 2008

(86) PCT No.: PCT/JP2008/063714
§ 371 (c)(1),
(2), (4) Date: Jan. 20, 2010

(87) PCT Pub. No.: WO2009/017181
PCT Pub. Date: Feb. 5, 2009

(65) Prior Publication Data
US 2010/0246569 A1    Sep. 30, 2010

(30) Foreign Application Priority Data
Jul. 27, 2007    (JP) .............................. P2007-196239

(51) Int. Cl.
*H04L 12/66* (2006.01)
(52) U.S. Cl. ..................................................... 370/352
(58) Field of Classification Search ........................ None
See application file for complete search history.

(56) References Cited

U.S. PATENT DOCUMENTS

| | | | |
|---|---|---|---|
| 7,436,943 | B2 | 10/2008 | Oshika et al. |
| 2002/0027901 | A1 | 3/2002 | Liu et al. |
| 2003/0147519 | A1* | 8/2003 | Jain et al. ................. 379/211.02 |
| 2006/0116117 | A1 | 6/2006 | Takase et al. |
| 2006/0268842 | A1 | 11/2006 | Takahashi et al. |

FOREIGN PATENT DOCUMENTS

| | | |
|---|---|---|
| EP | 1718029 A1 | 11/2006 |
| JP | 2002-057802 A | 2/2002 |

(Continued)

OTHER PUBLICATIONS

Supplementary European Search Report EP 08778360, dated Apr. 6, 2011.

*Primary Examiner* — Yong Zhou
(74) *Attorney, Agent, or Firm* — Lerner, David, Littenberg, Krumholz & Mentlik, LLP

(57) ABSTRACT

The present invention makes it possible to connect to and communicate with a connect destination by using a temporary number. In the present invention, a temporary number user terminal (100) registers a temporary number acquired from a SIP account server (300) in a SIP proxy server (400), and connects to and communicates with a connected user terminal (200) by using the temporary number. After the communication is finished, the temporary number is unregistered from the SIP proxy server (400), thereby disabling a connection from the connected user terminal (200). Also, connection conditions are provided by specifying the validity period of connection using a temporary number, the number of times connection can be made, the connect destination to which connection can be made, and the like, and only those calls which meet the connection conditions are accepted, thereby making it possible to restrict the uses of the temporary number.

5 Claims, 8 Drawing Sheets

FOREIGN PATENT DOCUMENTS

| | | |
|---|---|---|
| JP | 2002-261935 A | 9/2002 |
| JP | 2004-312385 A | 11/2004 |
| JP | 2006-270800 A | 10/2006 |
| JP | 2007-006456 A | 1/2007 |

* cited by examiner

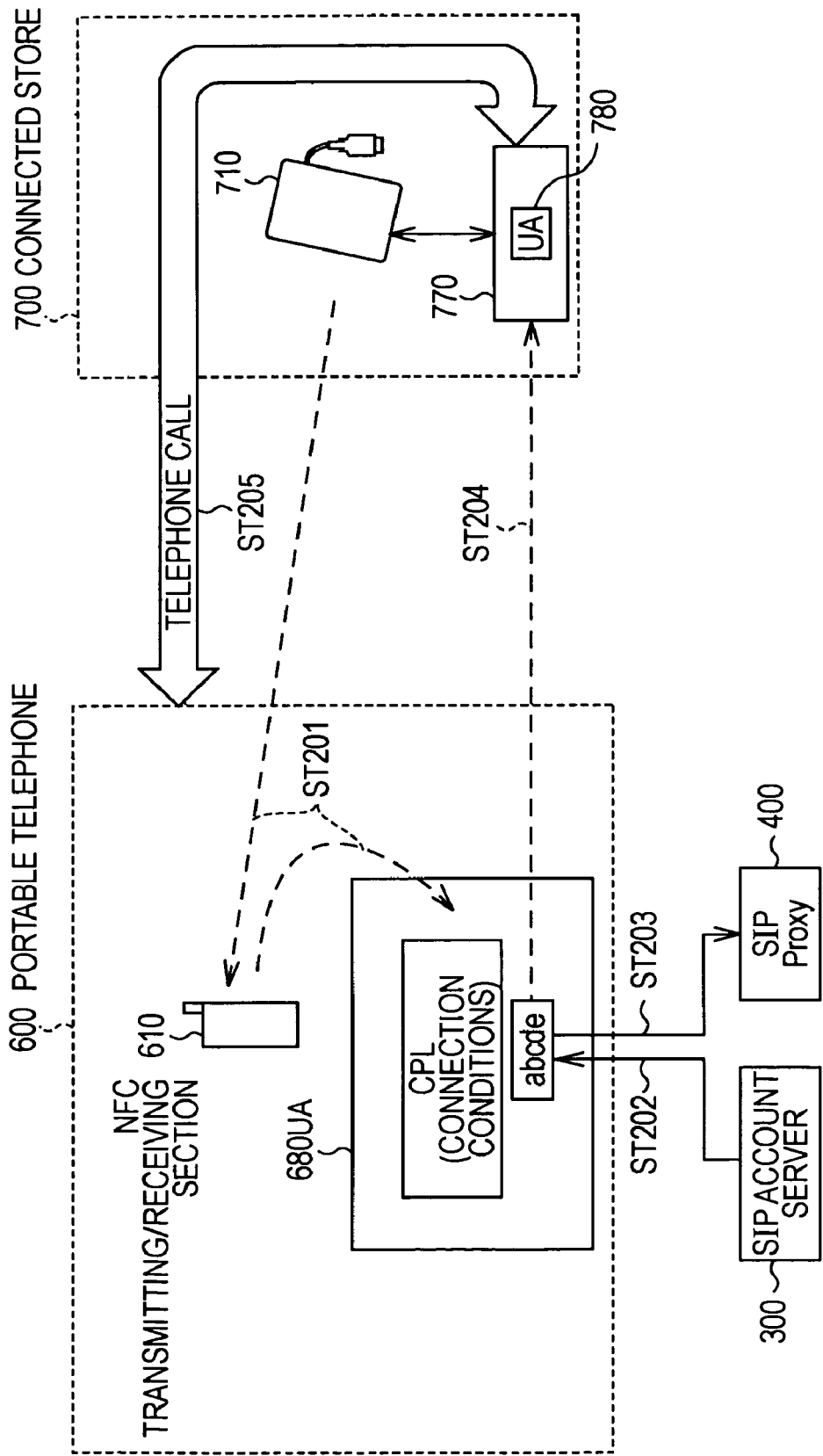

TEMPORARY CONNECTION NUMBER MANAGEMENT SYSTEM, TERMINAL, TEMPORARY CONNECTION NUMBER MANAGEMENT METHOD, AND TEMPORARY CONNECTION NUMBER MANAGEMENT PROGRAM

CROSS-REFERENCES TO RELATED APPLICATIONS

The present application is a national phase entry under 35 U.S.C. §371 of International Application No. PCT/JP2008/063714 filed Jul. 24, 2008, published on Feb. 5, 2009 as WO 2009/017181 A1, which claims priority from Japanese Patent Application No. JP 2007-196239 filed in the Japanese Patent Office on Jul. 27, 2007.

TECHNICAL FIELD

The present invention relates to a temporary connection number management system, a terminal, a temporary connection number management method, and a temporary connection number management program, which are suitable for application to the case of, for example, performing communication or making a telephone call with the other party by using a temporary connection number without letting the other party know one's own connection number such as a telephone number.

BACKGROUND ART

In the related art, when a user's telephone apparatus requests a center apparatus to issue a provisional number, the center apparatus issues a provisional number made up of a predetermined number of digits, notifies the telephone apparatus, and, at that time, registers the provisional number and the telephone number of the telephone apparatus in a conversion table in association with each other. A telephone number distribution system has been proposed in which when the user then tells the other party the provisional number notified from the center apparatus, and the other party places a telephone call by adding a specific number before the provisional number, a telephone number corresponding to the provisional number is retrieved from the conversion table in the center apparatus and transferred to the user's telephone apparatus, allowing the telephone call from the other party to be received by the provisional number. According to this system, it is possible to receive a telephone call from the other party without telling one's own telephone number to the other party (see, for example, Patent Document 1).

Also, in recent years, moves toward building a next generation network (hereinafter referred to as NGN), in which an existing line-switching telephone network is replaced with a network based on the IP (Internet Protocol) technology, have become increasingly active. The NGN includes a bandwidth guarantee function and a security function in the network itself, and performs session control using SIP (Session Initiation Protocol).

Patent Document 1: Japanese Unexamined Patent Application Publication No. 2002-261935
Patent Document 2: Japanese Unexamined Patent Application Publication No. 2006-270800

Incidentally, the telephone number distribution system described in Patent Document 1 mentioned above has a problem in that an apparatus for transferring a telephone call is necessary, there is a constraint such that incoming using a provisional number is possible but outgoing is not possible and, moreover, no condition can be put on incoming to the provisional number, making flexible operation difficult.

Also, while the telephone number management apparatus described in Patent Document 2 allows outgoing using a provisional number and setting of connection conditions, an apparatus that performs retrieval of a provisional number and a normal number and transfer of a telephone call in a centralized manner is required, and thus there is a fear of excessive load and rigorousness of operation.

DISCLOSURE OF INVENTION

The present invention has been made by taking the above points into consideration, and proposes a temporary connection number management system including a next generation network (NGN) and a terminal thereof, which makes it possible to place a telephone call to the other party or receive a telephone call from the other party by using a temporary connection number without having one's own connection number known, and set connection conditions for connecting to the other party by using the connection number.

To solve the above-mentioned problems, according to the present invention, there is provided a temporary connection number management system which connects a first terminal and a second terminal to each other by using a temporary connection number via a communication network that is subject to call control by SIP (Session Initiation Protocol) and capable of transmission-quality reservation, including a temporary connection number issuing device that issues the temporary connection number to the first terminal in response to a request from the first terminal, and a SIP proxy server in which the temporary connection number transmitted from the first terminal is registered, in which the first terminal includes temporary connection number requesting means for requesting the temporary connection number issuing device to issue the temporary connection number, registering means for registering in the SIP proxy server the temporary connection number issued from the temporary connection number issuing device in response to the requesting from the temporary connection number requesting means, notifying means for notifying the second terminal of the temporary connection number, communication control means for performing communication with the second terminal via the SIP proxy server by using the temporary connection number, and unregistering means for unregistering the temporary connection number registered in the SIP proxy server.

Thus, the user can communicate with the other party by using a temporary connection number, and unregister the temporary number as appropriate, without letting the other party know his/her own connection number.

According to the present invention, a temporary connection number management system can be realized with which the user can communicate with the other party, and set connection conditions with the other party to restrict connections to the other party, without letting the other party know his/her own connection number.

BRIEF DESCRIPTION OF DRAWINGS

FIG. 9 is a schematic diagram used for explaining a case in which a portable telephone having an NFC function is used.

BEST MODE FOR CARRYING OUT THE INVENTION

Hereinbelow, an embodiment of the present invention will be described in detail with reference to the drawings.

(1) Overall Configuration of Temporary Connection Number Management System

Figure 1:
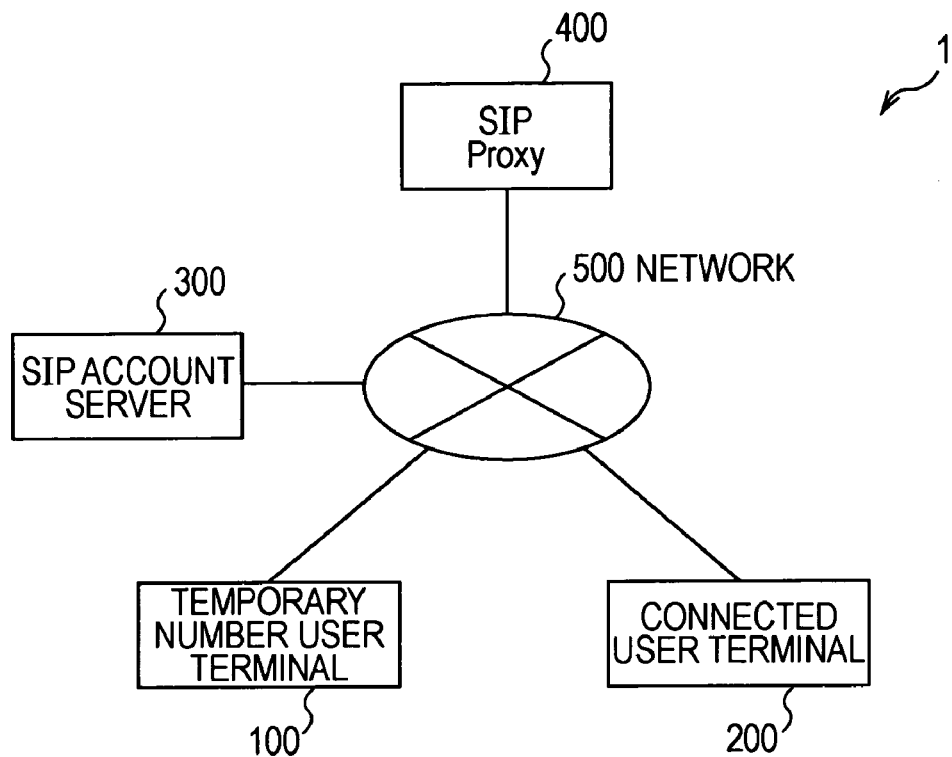
FIG. 1 is a schematic diagram showing the configuration of a temporary connection number management system.

In FIG. 1, 1 indicates a temporary connection number management system as a whole. The temporary connection number management system 1 has a configuration in which a temporary number user terminal (hereinafter described as user terminal as appropriate) 100, a connected user terminal 200, a SIP (Session Initiation Protocol) account server 300, and a SIP proxy server (SIP proxy) 400 are connected to a network (NGN (Next Generation Network)) 500. The next generation network (NGN) 500 is a communication network that performs session control using SIP.

In this system, the SIP account server 300, the user terminal 100, and the connected user terminal 200 each operate a SIP User Agent Client (SIP UAC). The SIP UAC is a SIP user agent that generates/transmits a SIP request, and receives/processes a response.

Also, the SIP proxy server 400 operates as a SIP User Agent Server that receives/processes a SIP request transmitted from each of these SIP UACs, and generates/transmits a response. The term SIP UAC or SIP as used in the following description refers to the SIP account server 300, the user terminal 100, and the connected user terminal 200.

It should be noted that although there may be a plurality of each of the user terminals 100 and the connected user terminals 200, in the following, for the simplicity of description, the user terminal 100 and the connected user terminal 200 are each described as a single terminal. The user terminal 100 and the connected user terminal 200 each register information about itself in the SIP proxy server 400 by using a REGISTER method. The information to be registered is, for example, a SIP URI (Uniform Resource Identifier), an IP address, and the like of each of the user terminal 100 and the connected user terminal 200.

The SIP account server 300 is configured to issue a temporary number when an acquisition request for a temporary number (temporary connection number) is made from the user terminal 100. The SIP proxy server 400 is a server that performs transfer (routing) of a SIP message. An inquiry is made to a location server by using a receive destination address included in a SIP header as a key to acquire an IP (Internet Protocol) address of the receive destination, and determines the destination of message transfer on the basis of the acquired IP address. The transfer destination is the IP address of a receive destination or another SIP proxy server.

The method of this message routing is the same as email routing by SMTP (Simple Mail Transfer Protocol). The equivalent of a telephone number in SIP is the SIP URI, which is in the same format as an email address, "name@domain". "sip:" is added at the top. An example is "sip: xxx@mail.com.".

Figure 2:
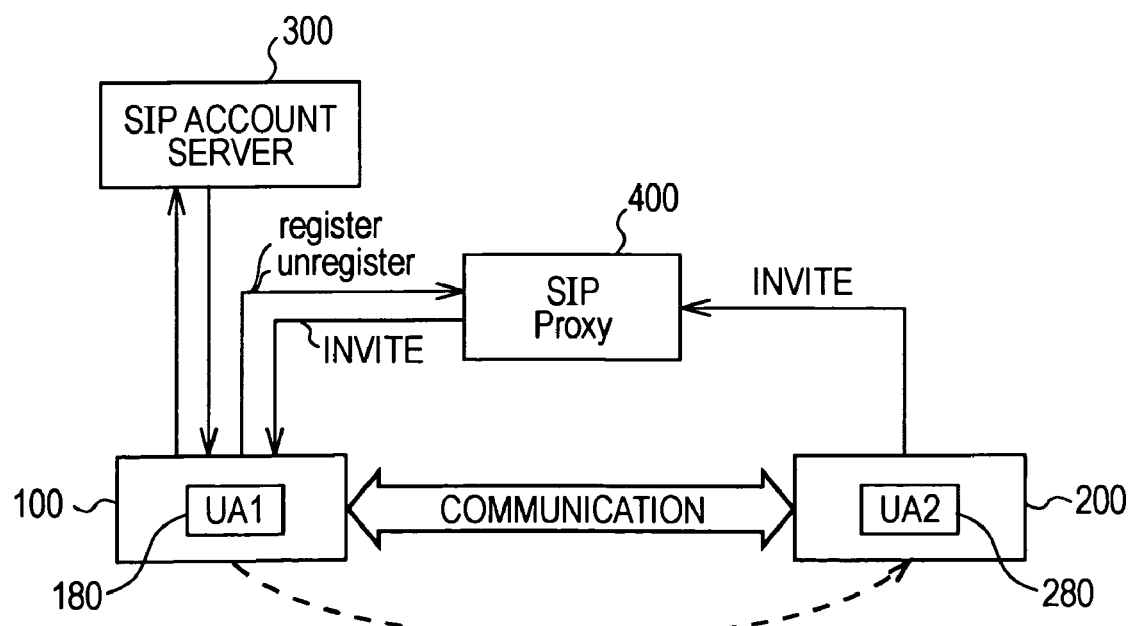
FIG. 2 is a schematic diagram showing the operation procedure of a temporary connection number management system.

FIG. 2 is a diagram showing the operation procedure of this system. First, when the user terminal 100 requests the SIP account server 300 for a temporary number, the SIP account server 300 transmits a temporary number to the user terminal 100.

Next, the user terminal 100 registers information about itself in the SIP proxy server 400 by using a REGISTER method. That is, the temporary number issued by the SIP account server 300, the IP address of the user terminal 100, and the like are registered in an unillustrated database of the SIP proxy server 400.

Next, the user terminal 100 notifies the connected user terminal 200 of the temporary number via the SIP proxy server 400. The connected user terminal 200 registers the temporary number notified from the user terminal 100, and makes a connection request to the user terminal 100 by using the temporary number. That is, a connection request to the user terminal 100 is made by transmitting an INVITE method to the SIP proxy server 400. The SIP proxy server 400 refers to the database to retrieve an IP address corresponding to the temporary number from the connection request based on this INVITE method, and transmits the IP address to the user terminal 100 corresponding to the IP address.

Upon receiving the connection request from the connected user terminal 200 via the SIP proxy server 400, the user terminal 100 refers to connection conditions described later, and if the connection conditions are met, transmits Connection OK to the connected user terminal 200 via the SIP proxy server 400. Thereafter, a telephone call is started between the connected user terminal 200 and the user terminal 100.

Figure 3:
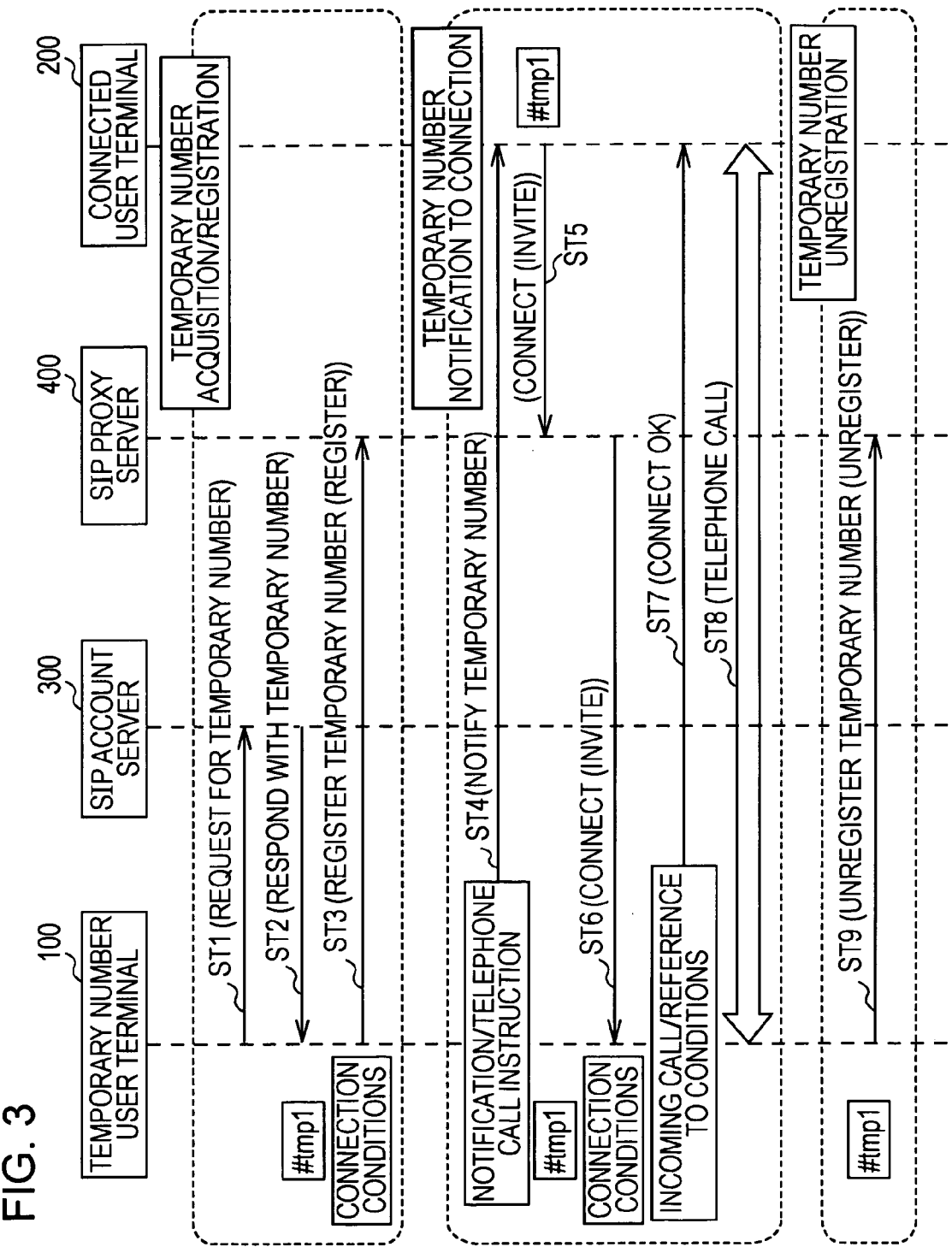
FIG. 3 is a diagram showing a temporary number connection procedure.

FIG. 3 shows a detailed procedure of how the user terminal 100 is connected to the connected user terminal 200 by using a temporary number. First, in step ST1, the temporary number user terminal 100 requests the SIP account server 300 for a temporary number. In step ST2, the SIP account server 300 transmits a temporary number to the connected user terminal 200.

Next, in step ST3, the connected user terminal 200 registers information about itself in the SIP proxy server 400 by using a REGISTER method. That is, the temporary number acquired from the SIP account server 300 and the IP address of the connected user terminal 200 are registered.

Next, in step ST4, the connected user terminal 200 notifies the user terminal 100 of the temporary number via the SIP proxy server 400. In step ST5, the user terminal 100 connects to the connected user terminal 200 by using the temporary number notified from the connected user terminal 200. That is, a connection request is made to the SIP proxy server 400 by using an INVITE method.

In step ST6, the SIP proxy server 400 transfers the INVITE method transmitted from the connected user terminal 200, to the temporary number user terminal 100.

In step ST7, the temporary number user terminal 100 having received the connection request based on the INVITE method transferred from the SIP proxy server 400 refers to the connection conditions to determine whether or not connection is possible, and if connection is possible, transmits Connection OK to the connected user terminal 200 via the SIP proxy server 400.

Thereafter, in step ST8, the temporary number user terminal 100, and the connected user terminal 200 that has received Connection OK from the temporary number user terminal 100 are connected to each other, and a telephone call is started. The temporary number is unregistered by the temporary user terminal 100 from the SIP proxy server 400 as appropriate by using an UNREGISTER method. This disables a connection to the user terminal 100 from the connected user terminal 200 by using the temporary number. Since the user terminal 100 has not notified the connected user terminal 200 of its SIP address, the user terminal 100 is not connected to by the connected user terminal 200 after unregistering the temporary number.

Figure 4:
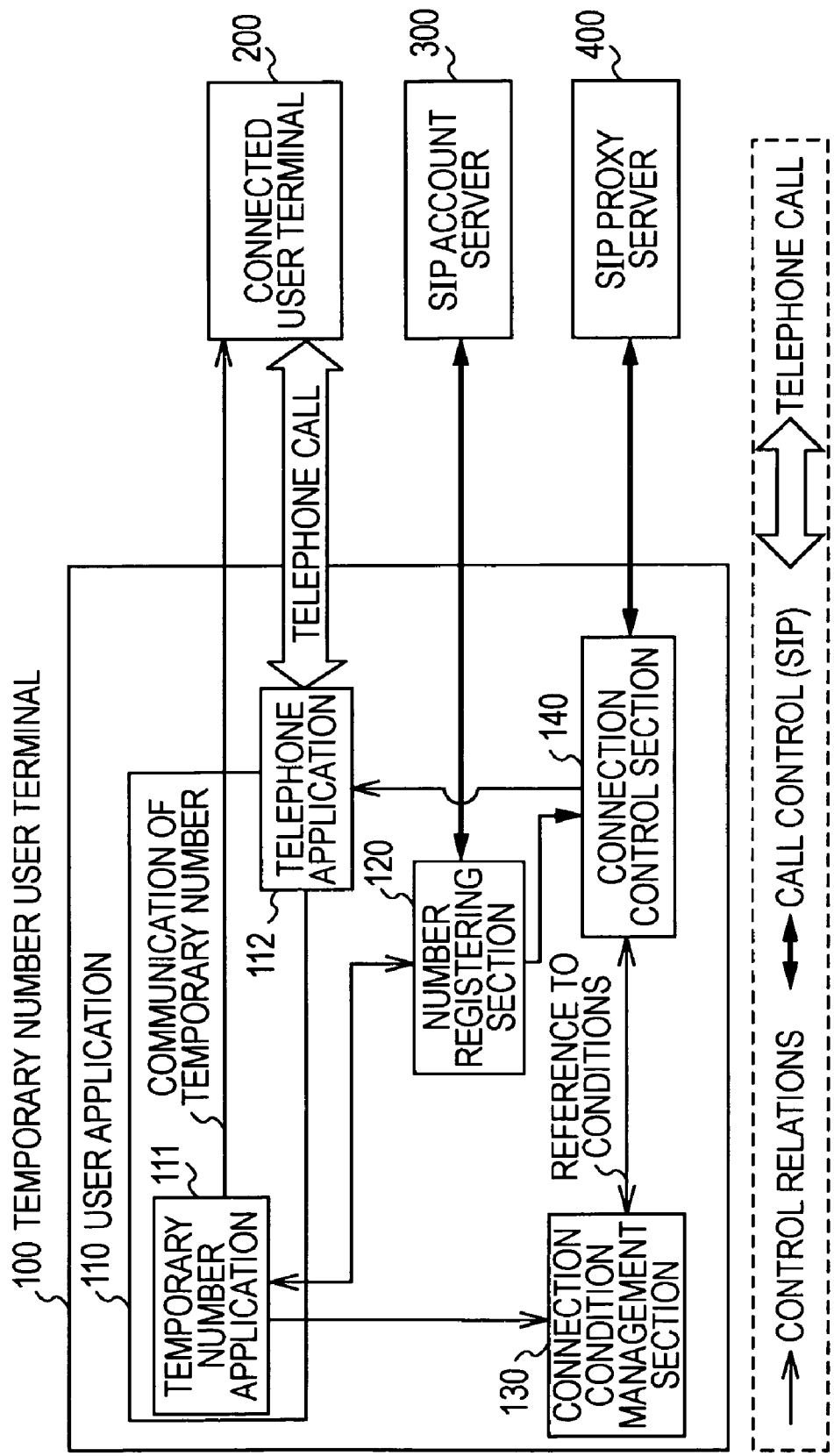
FIG. 4 is a schematic diagram showing the configuration of a temporary number user terminal.

FIG. 4 shows a configuration example of the temporary number user terminal 100. As shown in the figure, the temporary number user terminal 100 includes a user application 110, which includes a temporary number application 111 and a telephone application 112 and performs temporary number acquisition processing and telephone call processing, a number registering section 120, which requests the SIP account server 300 for a temporary number in accordance with an instruction from the temporary number application 111 and acquires the temporary number, a connection control section 140, which registers and unregisters the temporary number acquired from the SIP account server 300 in and from the SIP proxy server 400 and performs call control, and a connection condition management section 130 which stores connection conditions. The connection conditions stored in the connection condition management section 130 are configured to be referred to by the connection control section 140 as appropriate. Also, the temporary number application 111 is configured to notify the connected user terminal 200 of the temporary number acquired from the number registering section 120, via the SIP proxy server 400. Also, the telephone application 112 is configured to control telephone call processing with the connected user terminal 200.

The user application 110 is an application that controls the temporary number user terminal 100 as a whole, and is configured to directly accept designations from the user, such as a designation of a call destination and a designation of use of a temporary number, from user's operations.

The temporary number application 111 is configured to perform control of use of a temporary number, setting of connection conditions, communication of a temporary number to the connected user terminal 200, and the like. The temporary number application 111 can be configured as a plug-in application that is called from the user application 110.

The telephone application 112 is an application that performs transmission/reception (including a telephone call) of information such as audio, video, and character information to/from the connected user terminal 200, and can be independent from the user application 110 or incorporated into the user application 110 depending on the case.

The number registering section 120 is configured to perform register and unregister processing of connection numbers including a temporary number, and is configured to acquire a temporary number from the SIP account server 300 and store the temporary number, and supply the acquired temporary number to the temporary number application 111.

The connection control section 140 is configured to read a temporary number stored in the number registering section 120, register this temporary number in the SIP proxy server 400, unregister the registered temporary number, and perform connection control (signaling) for a telephone call such as a connection request, establishment, or disconnection.

The connection condition management section 130 is configured to hold the connection conditions for transmitting/receiving audio, video, character information, and the like to/from the connected user terminal 200 by using a temporary number, such as the validity period of connection using a temporary number, the number of times connection can be made, and the connect destination to which connection can be made, and be referred to by the connection control section 140 as appropriate.

Figure 5:
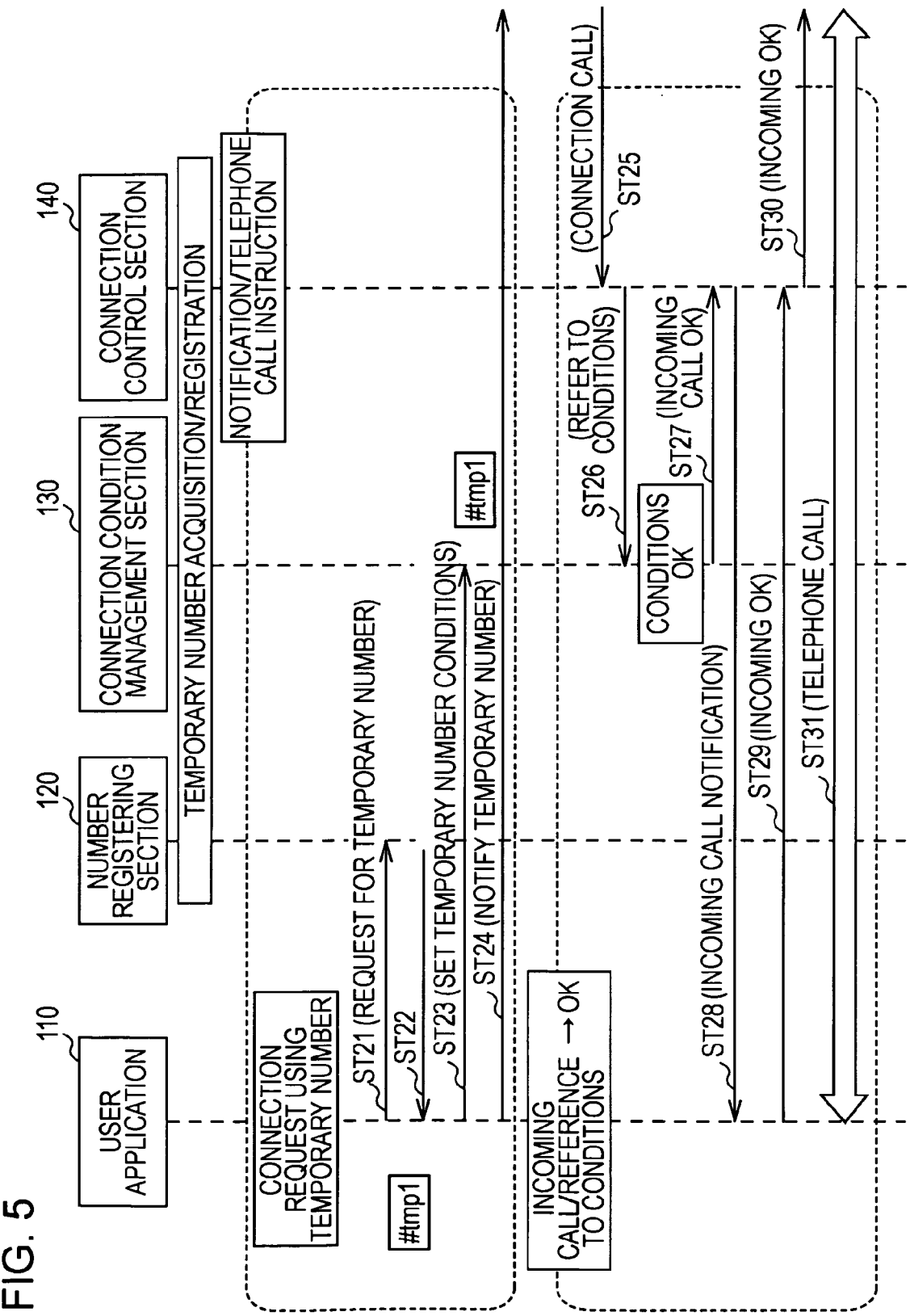
FIG. 5 is a sequence diagram showing a connection processing procedure (successful connection) within a user terminal.

FIG. 5 shows the procedure of connection processing when a connection succeeds in the temporary number user terminal 100. First, in step ST21, the temporary number application 110 of the user application 100 requests the number registering section 120 for a temporary number. In step ST22, the number registering section 120 requests the SIP account server 300 for a temporary number, and supplies the acquired temporary number to the temporary number application 111.

Next, in step ST23, the user application 110 sets the connection conditions under which a connection using a temporary number can be made, with respect to the connection condition management section 130. Next, in step ST24, the temporary number application 111 of the user application 110 notifies the connected user terminal 200 of the temporary number via the SIP proxy server 400.

Also, the number registering section 120 registers the acquired temporary number in the SIP proxy server 400 via the connection control section 140.

Next, upon receiving in step ST25 a connection request using a temporary number from the connected user terminal 200, the connection control section 140 refers to the connection conditions stored in the connection condition management section 130 in step ST26, and upon receiving in step ST27 from the connection condition management section 130 a Conditions OK (Incoming Call OK) response indicating that the connection conditions are met, performs an incoming call notification with respect to the user application 110.

When the user instructs Incoming OK upon receiving the incoming call notification, in step ST29, data indicating Incoming OK is supplied to the connection control section 140 by the user application 110. In step ST30, the connection control section 140 having received this data transmits data indicating Incoming OK to the connected user terminal 200 via the SIP proxy server 400. Thus, in step ST31, the temporary number user terminal 100 and the connected user terminal 200 are connected to each other, and a telephone call is started.

Figure 6:
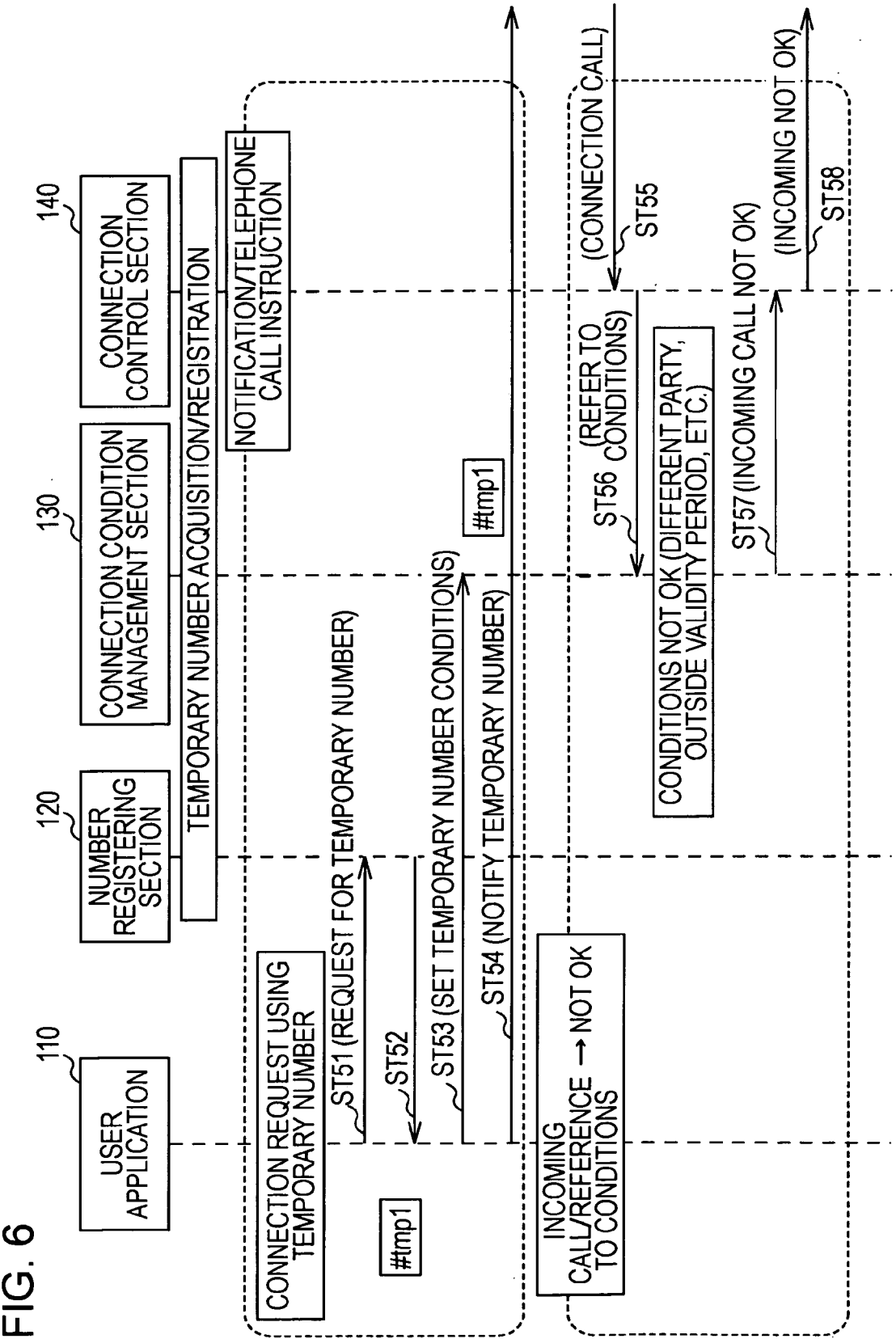
FIG. 6 is a sequence diagram showing a connection processing procedure (incoming rejection) within a user terminal.

FIG. 6 shows the procedure of connection processing when incoming is rejected in the temporary number user terminal 100. First, in step ST51, the temporary number application 110 of the user application 100 requests the number registering section 120 for a temporary number. In step ST52, the number registering section 120 requests the SIP account server 300 for a temporary number, and supplies the acquired temporary number to the temporary number application 111.

Next, in step ST53, the user application 110 sets the connection conditions under which a connection using a temporary number can be made, with respect to the connection condition management section 130. Next, in step ST54, the temporary number application 111 of the user application 110 notifies the connected user terminal 200 of the temporary number via the SIP proxy server 400.

Also, the number registering section 120 registers the acquired temporary number in the SIP proxy server 400 via the connection control section 140.

Next, upon receiving in step ST55 a connection request (connection call) using a temporary number from the connected user terminal 200, the connection control section 140 refers to the connection conditions stored in the connection condition management section 130 in step ST56, and upon receiving in step ST57 from the connection condition management section 130 a Conditions Not OK (Incoming Call Not OK) response indicating that the connection conditions are not met (for example, the connection conditions are not met for such reasons that the connect destination is different from the connect destination to which connection can be made, the current time falls outside the validity period, and the number of times connection can be made to the same party has been exceeded), in step ST58, the connection control section 140 transmits the Incoming Call Not OK to the SIP proxy server 400 via the connected user terminal 200.

Figure 7:
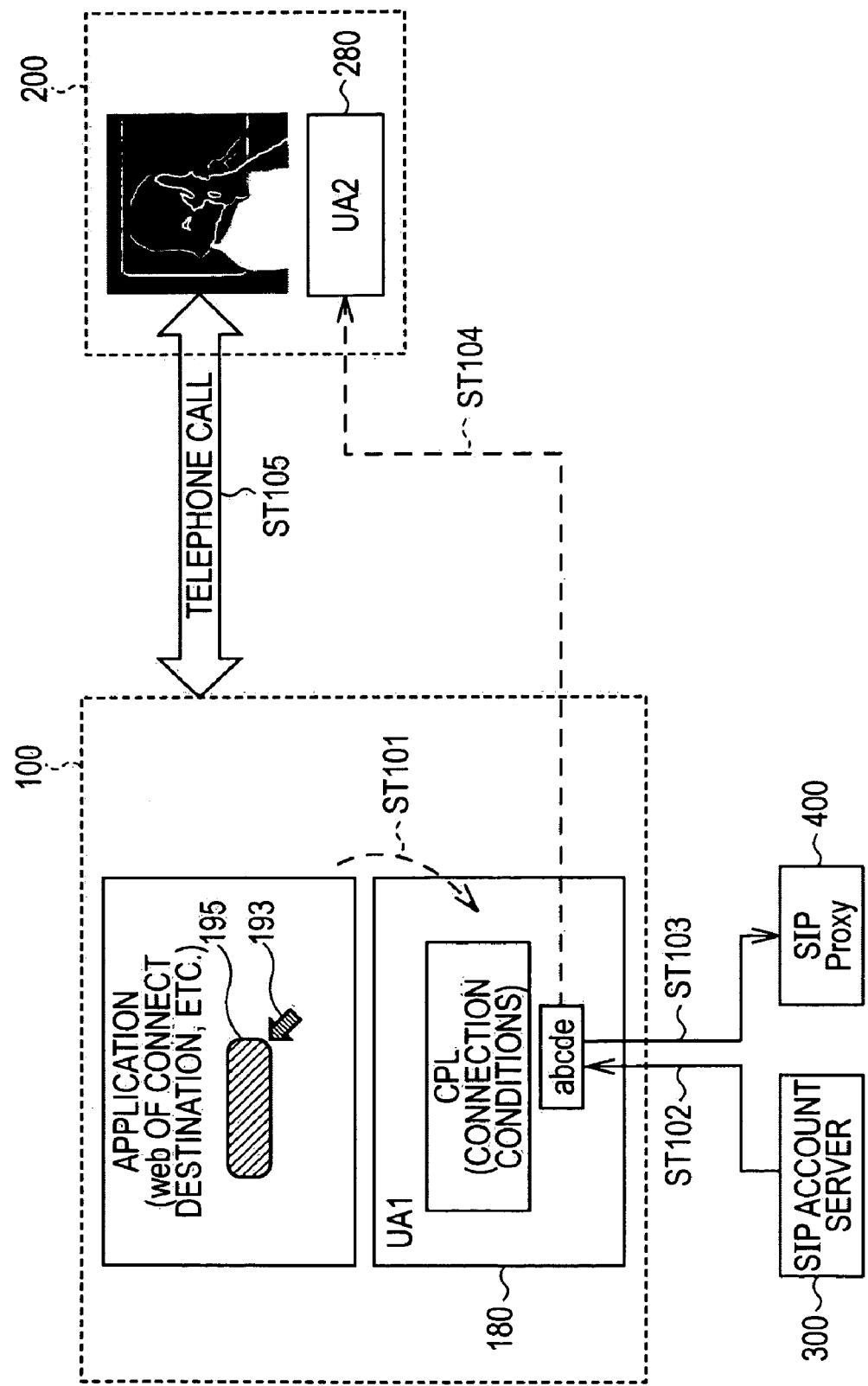
FIG. 7 is a schematic diagram showing a connection procedure via a network application.

FIG. 7 is a diagram showing a connection procedure via a network application. While browsing a Web site of a connect destination using the user terminal 100, a cursor 193 is moved by using an unillustrated mouse or the like to a button 195 for instructing, for example, start of a telephone call which is displayed in the Web page, and the left button of the unillustrated mouse is clicked, the clicking (event) is recognized by an Web site-based event monitoring program, and in step ST101, information (such as the email address and IP address) on the connected user terminal 200 and the connection conditions (CPL) are added to a user agent (UA1) 180.

Next, in step ST102, a temporary number is acquired from the SIP account server 300 by background processing of the user agent (UA1) 180. In step ST103, the acquired temporary number is registered in the SIP proxy server 400. Also, in step ST104, a user agent (UA2) 280 of the connected user terminal 200 is notified of the temporary number by HTTPS (Hypertext Transfer Protocol Security) or the like via the SIP proxy server 400.

Next, in step ST105, the temporary number user terminal 100 and the connected user terminal 200 are connected to each other, and a telephone call is made. After the telephone call is finished, the user agent (UA1) 180 unregisters the temporary number from the SIP proxy server 400 automatically in accordance with the connection conditions, or at a user's instruction. While this example is directed to the case of making a telephone call, it is also possible to perform transmission/reception of at least one of audio, video, character information, and the like. Also, the user agent (UA1) 180 can unregister the temporary number from the SIP proxy server 400 at a user's instruction even without a telephone call.

Figure 8:
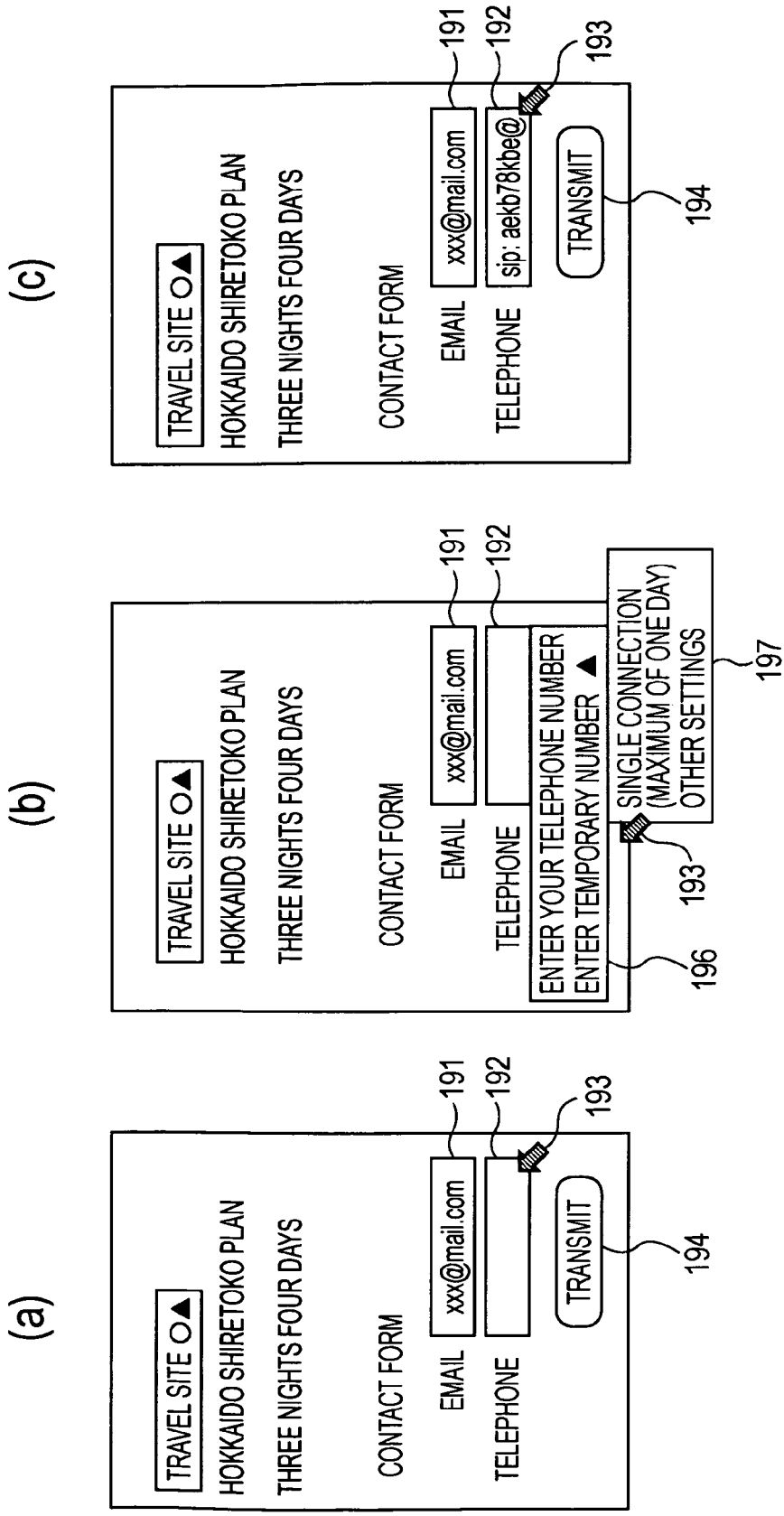
FIG. 8 is a schematic diagram showing a screen display example of a temporary number user terminal.

FIG. 8 is an example of the screen of the Web site shown in FIG. 7. This example illustrates the procedure for making inquiries about a travel plan offered on a travel site by using a temporary number. First, as shown in FIG. 8(a), an email address (in this example, "xxx@mail.com") is entered into an email entering field 191 constituting a contact form.

Next, as shown in FIG. 8(b), one's own telephone number is entered into a telephone number entering field 192 constituting the contact form. At this time, by moving the cursor 193 to the telephone number entering field and performing a right click, a pull-down menu 196 is displayed. Thus, when the cursor 193 is moved to the item "enter temporary number" in the pull-down menu 196, and a click is performed, a connection using a temporary number is selected, and a pull-down menu 197 is displayed. As the first item in the pull-down menu 197, a connection condition "single connection (maximum of one day)" as a specified value is displayed, and "other settings" is displayed as the next item. When setting a specified value, the specified value is set by moving the cursor to the item "single connection (maximum of one day)" and performing a click. On the other hand, when it is desired to set other connection conditions finely, other detailed conditions can be set by clicking on the item "other settings" in the pull-down menu 197. In this example, the item "enter temporary number" is selected, and "sip:aekb78kbe@mail.com" is assigned as a temporary number.

Next, when a transmit button 194 is clicked, the temporary number is registered in the SIP proxy server 400, and the connected user terminal 200 that is running this travel site is notified of the temporary number. This makes it possible to transmit an email to or make a telephone call with the connected user terminal 200 by using the temporary number. Also, it is possible to transmit an email to or make a telephone call with the user terminal 100 from the connected user terminal 200 by using the temporary number.

(2) Operation and Effect

In the above-described configuration, by registering a temporary number acquired from the SIP account server 300 in the SIP proxy server 400, the temporary number user terminal 100 can connect to and communicate with the connected user terminal 200 by using the temporary number. Also, by unregistering the temporary number from the SIP proxy server 400, a connection from the connected user terminal 200 can be disabled. Also, by providing connection conditions by specifying the validity period of connection using a temporary number, the number of times connection can be made, the connect destination to which connection can be made, and the like, and accepting only those calls which satisfy the connection conditions, the uses of the temporary number can be restricted.

According to the above-described configuration, the temporary number user terminal 100 can connect to the connected user terminal 200 via the SIP proxy server 400 by using a temporary number acquired from the SIP account server 300, and can also set arbitrary connection conditions, thereby making it possible to perform restricted secure communications with the connected user terminal 200.

(3) Other Embodiments

While the above-described embodiment is directed to the case in which the NGN is used for the acquisition of connection information or connection conditions, the present invention is not limited to this. It is also possible to use communications based on near field communication (NFC) such as Felica or RFID (Radio Frequency Identification) for the acquisition of connection information or connection conditions. For example, as shown in FIG. 9, when a user visits a connected store 700, an NFC transmitting/receiving section 610 of a portable telephone 600 capable of communication by NFC is made to touch an NFC transmitter/receiver 710 connected to a connected user terminal 770 installed in the connected store 700, and connection information or connection conditions are read from the NFC transmitter 710 and set in a user agent (UA) 680 (step ST201). Also, by background processing, a temporary number is acquired from the SIP account server 300 (step ST202), the acquired temporary number is registered in the SIP proxy server 400 (step ST203), and a user agent (UA) 780 of the connected user terminal 770 of the connected store 700 is notified of the temporary number by HTTPS or the like via the SIP proxy server 400 (step ST204).

Next, the portable telephone 600 and the connected user terminal 770 are connected to each other, and a telephone call is made (including cases when at least one of audio, video, character data, and the like is transmitted/received) (step ST205). After the telephone call is finished, the user agent (UA) 680 unregisters the temporary number from the SIP proxy server 400 in accordance with the connection conditions automatically or at a user's instruction. The user agent (UA) 680 can also unregister the temporary number from the SIP proxy server 400 at a user's instruction even without a telephone call.

While the above-described embodiment is directed to the case in which the temporary number user terminal 100 is used, the present invention is not limited to this. A portable telephone or other such portable terminal may be used as well. Also, while in the above-described embodiment a temporary number is automatically unregistered after making a telephone call or the like, even without a telephone call or the like, the temporary number may be unregistered by the user as appropriate or the connection conditions may be changed.

Also, the connection conditions stored in the connection condition management section 130 of the user terminal 100 can be transmitted to the SIP proxy server 400 via the connection control section 140. By holding the connection conditions in the SIP proxy server 400, it is possible for the SIP proxy server 400 to perform a process of referring to the connection conditions and determining whether Incoming Call OK or not.

Further, the above-described embodiment is directed to the case in which a temporary connection number management system includes the temporary number user terminal 100 as a first terminal, the connected user terminal 200 as a second terminal, the SIP account server 300 as a temporary number issuing device, the SIP proxy server 400 as a SIP proxy server, the number registering section 120 as temporary connection number requesting means, the connection control section 140 as registering means for registering a temporary connection number in the SIP proxy server, the temporary number application 111 as notifying means for notifying the second terminal of the temporary connection number, the telephone application 112 as communication control means for performing communication with the second terminal via the SIP proxy server by using the temporary connection number, and the connection control section 140 as unregistering means for unregistering the temporary connection number registered in the SIP proxy server 400. However, the present invention is not limited to this, and the temporary connection number management system can include various other means.

INDUSTRIAL APPLICABILITY

The temporary connection number management system, the terminal, the temporary connection number management method, and the temporary connection number management program according to the present invention can be applied to the case of, for example, assigning a temporary telephone number to a fixed telephone or a portable telephone.

The invention claimed is:

1. A temporary connection number management system which connects a first terminal and a second terminal to each other by using a temporary connection number via a communication network that is subject to call control by SIP (Session Initiation Protocol) and capable of transmission-quality reservation, comprising:

a temporary connection number issuing device that issues the temporary connection number to the first terminal in response to a request from the first terminal; and a SIP proxy server in which the temporary connection number transmitted from the first terminal is registered, in which the first terminal includes temporary connection number requesting means for requesting the temporary connection number issuing device to issue the temporary connection number, registering means for registering in the SIP proxy server the temporary connection number issued from the temporary connection number issuing device in response to the requesting from the temporary connection number requesting means, notifying means for notifying the second terminal of the temporary connection number, communication control means for performing communication with the second terminal via the SIP proxy server by using the temporary connection number, and unregistering means for unregistering the temporary connection number registered in the SIP proxy server, further comprising condition storing means for storing a number of conditions for connecting to the terminal by using the temporary connection number, in which the first terminal and the second terminal perform communication only when the number of conditions are met, and in which each condition of the number of conditions is set by a user.

2. A terminal which connects to a connected terminal by using a temporary connection number issued by a temporary connection number issuing device via a communication network that is subject to call control by SIP (Session Initiation Protocol) and capable of transmission-quality reservation, comprising:

temporary connection number requesting means for requesting the temporary connection number issuing device to issue the temporary connection number;

registering means for registering in a SIP proxy server the temporary connection number issued from the temporary connection number issuing device in response to the requesting from the temporary connection number requesting means;

notifying means for notifying the connected terminal of the temporary connection number;

communication control means for performing communication with the connected terminal via the SIP proxy server by using the temporary connection number; and unregistering means for unregistering the temporary connection number registered in the SIP proxy server, and further comprising condition input means for enabling a user to input a condition or conditions in which connection to the terminal by using the temporary connection number is permitted, in which the terminal and the connected terminal perform communication only when the condition or conditions are met.

3. A temporary connection number management method for a first terminal in a temporary connection number management system which connects the first terminal and a second terminal to each other by using a temporary connection number via a communication network that is subject to call control by SIP (Session Initiation Protocol) and capable of transmission-quality reservation, comprising:

a temporary connection number requesting step of requesting a temporary connection number issuing device to issue the temporary connection number, by temporary connection number requesting means;

a registering step of registering in a SIP proxy server the temporary connection number issued from the temporary connection number issuing device in response to the requesting in the temporary connection number requesting step, by registering means;

a notifying step of notifying the second terminal of the temporary connection number by notifying means;

a communication control step of performing communication with the second terminal via the SIP proxy server by using the temporary connection number, by communication control means; and an unregistering step of unregistering the temporary connection number registered in the SIP proxy server, by unregistering means, further comprising a condition storing step of storing a number of conditions for connecting to the terminal by using the temporary connection number, in which the first terminal and the second terminal perform communication only when the number of conditions are met, and in which each condition of the number of conditions is set by a user.

4. A temporary connection number management system which connects a first terminal and a second terminal to each other by using a temporary connection number via a communication network that is subject to call control by SIP (Session Initiation Protocol) and capable of transmission-quality reservation, comprising:

a temporary connection number issuing device that issues the temporary connection number to the first terminal in response to a request from the first terminal; and a SIP proxy server in which the temporary connection number transmitted from the first terminal is registered, in which the first terminal includes a temporary connection number requesting device that requests the temporary connection number issuing device to issue the temporary connection number, a registering device that registers in the SIP proxy server the temporary connection number issued from the temporary connection number issuing device in response to the requesting from the temporary connection number requesting device, a notifying device that notifies the second terminal of the temporary connection number, a communication control device that performs communication with the second terminal via the SIP proxy server by using the temporary connection number, and an unregistering device that unregisters the temporary connection number registered in the SIP proxy server, further comprising a condition storing device that stores a number of conditions for connecting to the terminal by using the temporary connection number, in which the first terminal and the second terminal perform communication only when the number of conditions are met, and in which each condition of the number of conditions is set by a user.

5. A terminal which connects to a connected terminal by using a temporary connection number issued by a temporary connection number issuing device via a communication network that is subject to call control by SIP (Session Initiation Protocol) and capable of transmission-quality reservation, comprising:

a temporary connection number requesting device that requests the temporary connection number issuing device to issue the temporary connection number;

a registering device that registers in a SIP proxy server the temporary connection number issued from the temporary connection number issuing device in response to the requesting from the temporary connection number requesting device;

a notifying device that notifies the connected terminal of the temporary connection number;

a communication control device that performs communication with the connected terminal via the SIP proxy server by using the temporary connection number; and an unregistering device that unregisters the temporary connection number registered in the SIP proxy server, and further comprising a condition input device that enables a user to input a condition or conditions in which connection to the terminal by using the temporary connection number is permitted, in which the terminal and the connected terminal perform communication only when the condition or conditions are met.

* * * * *